United States Patent [19]

Schoberg

[11] Patent Number: 4,921,270
[45] Date of Patent: May 1, 1990

[54] CONVERTIBLE HAND TRUCK

[75] Inventor: Carl J. Schoberg, Zumbro Falls, Minn.

[73] Assignee: Liberty Diversified Industries, Minneapolis, Minn.

[21] Appl. No.: 230,486

[22] Filed: Aug. 10, 1988

[51] Int. Cl.⁵ .............................................. B62B 11/00
[52] U.S. Cl. ............................... 280/655.1; 280/47.27; 280/47.28; 280/47.315; 414/490
[58] Field of Search ............. 280/655.1, 47.131, 47.17, 280/47.2, 47.24, 47.27, 47.28, 47.29, 47.34, 47.371, 655, 654; 414/490

[56] References Cited

U.S. PATENT DOCUMENTS

| | | | |
|---|---|---|---|
| 3,193,123 | 7/1965 | Wouden | 280/47.27 |
| 3,785,669 | 1/1974 | Doheny | 280/47.18 |
| 4,121,855 | 10/1978 | Mortenson | 280/47.29 X |
| 4,401,319 | 8/1983 | Kazmark | 280/655 |

FOREIGN PATENT DOCUMENTS 2286040 4/1976 France .................................. 280/654

Primary Examiner—Charles A. Marmor
Assistant Examiner—Tamara L. Finlay
Attorney, Agent, or Firm—Moore & Hansen

[57] ABSTRACT

A convertible hand truck including a pivotable handle member which may be stowed or selectively used as an extension of the toe plate when the hand truck is in an upright two-wheeled position, and may serve as the push handle for the hand truck when used in an horizontal four-wheeled position. The pivoting handle member is releasably coupled to the toe plate of the hand truck when in the horizontal position by a bracket which wraps partially around and slides along the handle member and extends between the two opposing upright handle segments. The bracket remains flush with the frame when in the stowed position, and has an offset tang which engages the top edge of the toe plate when the handle member is in the upright and secured position.

8 Claims, 3 Drawing Sheets

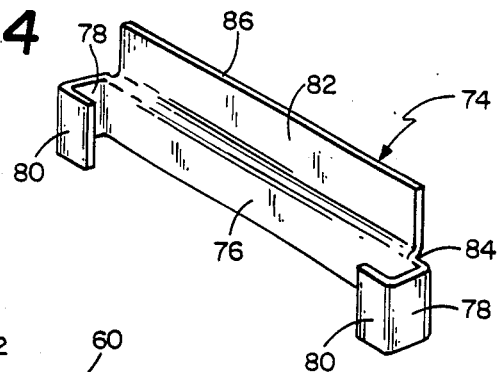
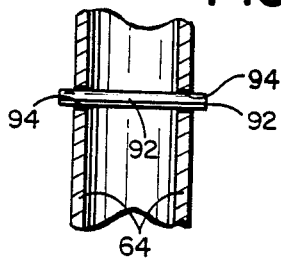
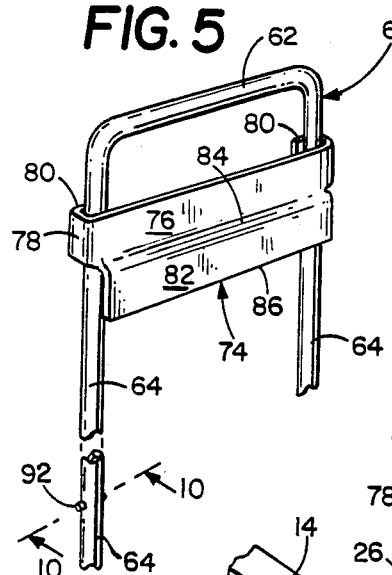
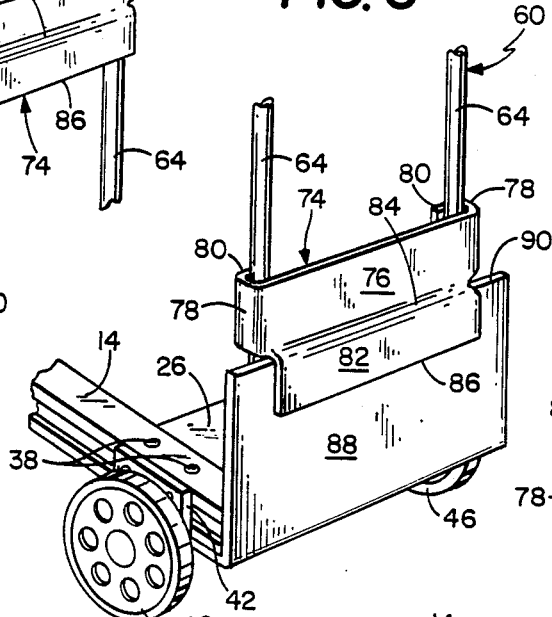

CONVERTIBLE HAND TRUCK

BACKGROUND OF THE INVENTION

This invention relates generally to hand trucks or dollies used for moving heavy articles, and particularly to a hand truck which may be converted from use as an upright two wheeled hand truck to a horizontal four-wheeled cart.

The basic two-wheeled upright hand truck has been an indispensable tool in businesses and homes for many decades. Various modifications to the two-wheeled hand truck have been developed to make the hand truck more functional, such as means for securing articles to the frame of the hand truck, supplying the hand truck with powered lifting capabilities, braking and anti-tip mechanisms, or particular combinations of handle placements and positions. Specialized hand trucks have been designed for use in particular applications such as on stairs or ramps, with articles such as drums or bags, or convertible hand trucks with frames having adjustable angles or platforms which allow the hand trucks to be used as portable office utility carts.

One particular development has been the two-wheeled upright hand truck which is convertible to a four-wheeled push cart. One representative example of such a hand truck is shown in U.S. Pat. No. 3,785,669 to Doheny, wherein a pivotable handle mounted near the top of the upright hand truck and having smaller castered wheels attached at the ends thereof may be pivoted relative to the frame in order to bring the handle into an upright position and the wheels into contact with the floor when the hand truck is lowered to a horizontal position.

Another development has been in the area of extensible toe plates for hand trucks, which greatly increase the leverage obtainable in supporting a load compared with conventional hand truck toe plates, but which also allow the user the option of stowing or retracting the toe plate when not in use. One such design is shown in U.S. Pat. No. 4,121,855 to Mortenson.

Similar examples of such hand truck designs can be found in the variety of commercial models which are currently available through such companies as MagLine, Inc. of Pinconning, Mich. and Valley Craft, Inc. of Minneapolis, Minn.

Of particular interest is U.S. Pat. No. 3,193,123 to Wouden, which discloses a convertible four-wheeled hand truck in which the extension to the toe plate comprises a frame member which also serves at the handle when the truck is in the horizontal position, with the handle being couplable to the conventional toe plate by a pair of pronged sleeves.

Although there are several currently marketed hand trucks which have similar frame members serving as the toe plate extensions, and which may be similarly converted to four wheeled use, the concept of attaching to coupling the handle frame to the toe plate was not accepted in the market. This may be due to several drawbacks in the Wouden '123 design, such as the sleeves being separate and distinct, an therefore requiring two hands to properly engage the prongs on the toe plate. If both sleeves are not lifted above the top edge of the toe plate simultaneously, the lower one of the sleeves will prevent the handle frame member from being pivoted close enough to the toe plate to permit the prong on the lifted sleeve to engage the toe plate. The sleeves are also subject to rotating out of alignment on the handle member when not in use, and the prongs of the sleeves present the hazard of snagging or scratching the article being transported. Moreover, the sleeves may not be readily removed or replaced if broken, and cannot be substituted on other hand trucks.

BRIEF SUMMARY OF THE INVENTION

It is therefore one object of this invention to design a convertible hand truck which may be used in either an upright two-wheeled or horizontal four-wheeled position having a pivotable handle member which may be used as an extension for the toe plate in the upright position and which may be secured to the toe plate for use as a push handle when in the horizontal position.

It is a particular object of this invention to design the means for releasably securing the handle member to the toe plate such that the handle member may be easily secured by an individual using one hand, and further such that the means will not interfere or obstruct the upright operation of the hand truck, and can be removed from the hand truck when not desired, or when it must be replaced or used with another hand truck.

Briefly described, the hand truck of this invention includes a pivotable handle member which may be stowed or selectively used as an extension of the toe plate when the hand truck is in the upright two-wheeled position, and may serve as the push handle for the hand truck when used in the horizontal four-wheeled position. The pivoting handle member is releasably coupled to the toe plate of the hand truck when in the horizontal position by means of a bracket which wraps partially around and slides along the handle member and extends between the two opposing upright handle segments The bracket remains flush with the frame when in the stowed position, and has an offset tang which engages the top edge of the toe plate when the handle member is in the upright and secured position

BRIEF DESCRIPTION OF THE DRAWINGS

FIG. 4 is a perspective view of the bracket used to secure the handle member to the toe plate;

FIG. 5 is a perspective view of the top portion of the handle member in the extended position with the bracket being installed thereon;

FIG. 6 is a perspective view of the bottom portion of the handle member in the extended position showing the bracket engaging the toe plate;

FIG. 7 is a perspective view of the bottom portion of the handle member in the extended position showing the bracket disengaged from and lifted above the toe plate;

FIG. 10 is a cross section view of the one of the handle segments and retaining pins of the hand truck of FIG. 8; and FIG. 11 is a partially exploded perspective view of the pivotal handle member mounted on the frame of the hand truck.

DESCRIPTION OF THE PREFERRED EMBODIMENT

The convertible hand truck of this invention is shown in FIGS. 1-11 and referenced generally therein by the numeral 10. As may be seen by comparison with many of the prior art hand trucks (not shown), the basic structural elements of the hand truck 10 of this invention are somewhat conventional and detailed description of its features would not be required for those reasonably skilled in the art. It is understood that the novel elements of the hand truck 10 may be utilized with or incorporated into a wide variety of hand truck designs, of which the following disclosure provides a representative example.

Figures 1, 2:
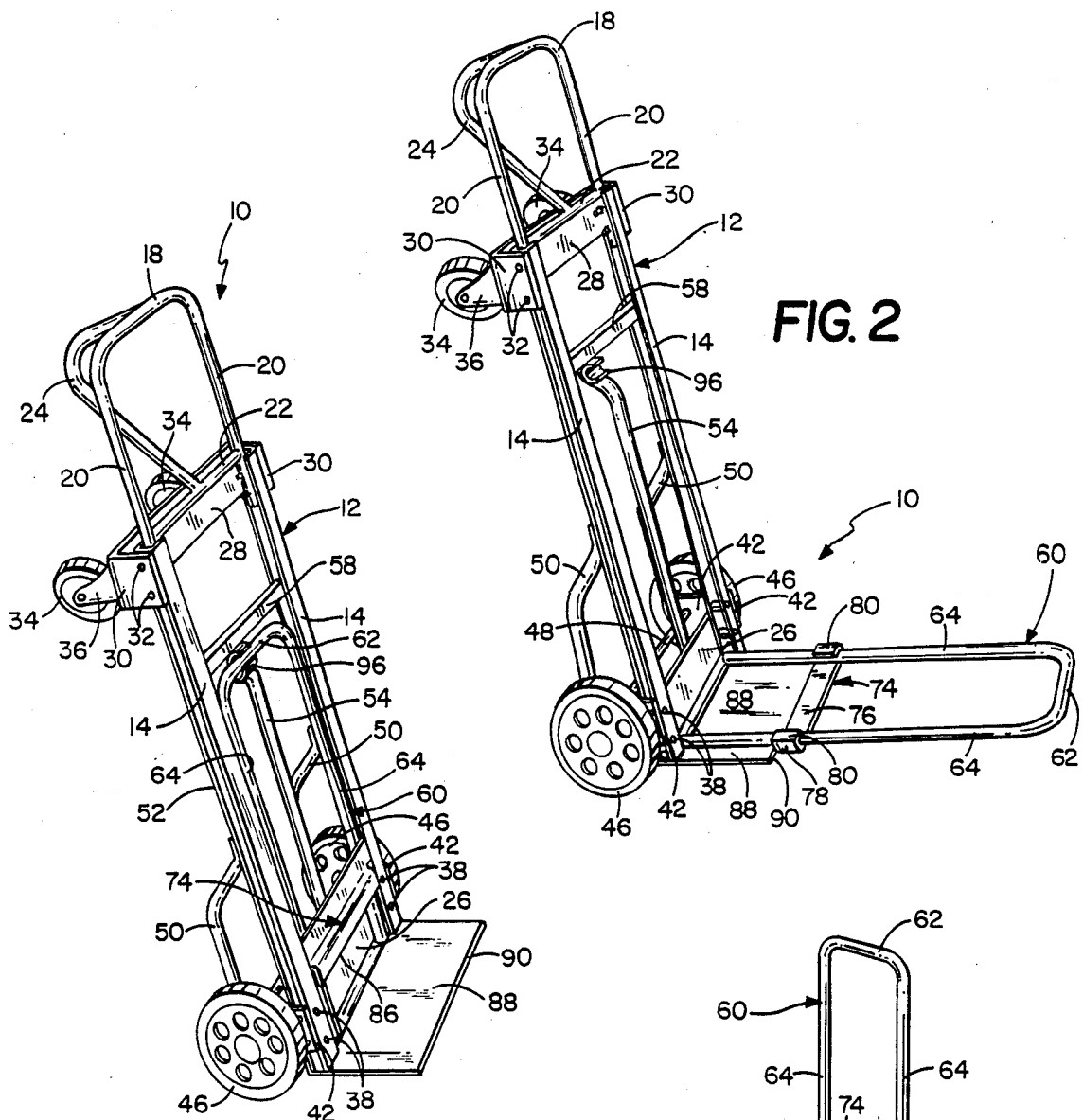
FIG. 1 is a perspective view of the hand truck of this invention in the upright two-wheeled position with the handle member in the stowed or retracted position.
FIG. 2 is a perspective view of the hand truck of this invention in the upright two-wheeled position with the handle member in the extended position.
Figure 3:
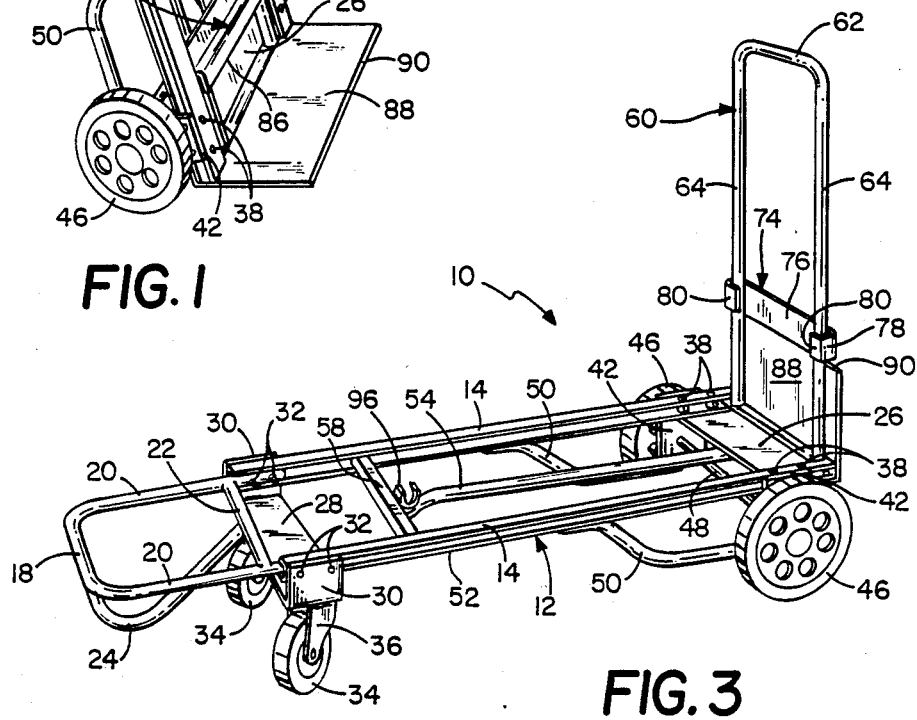
FIG. 3 is a perspective view of the hand truck of this invention in the horizontal four-wheeled position with the handle member extended and secured to the toe plate.
Figure 8:
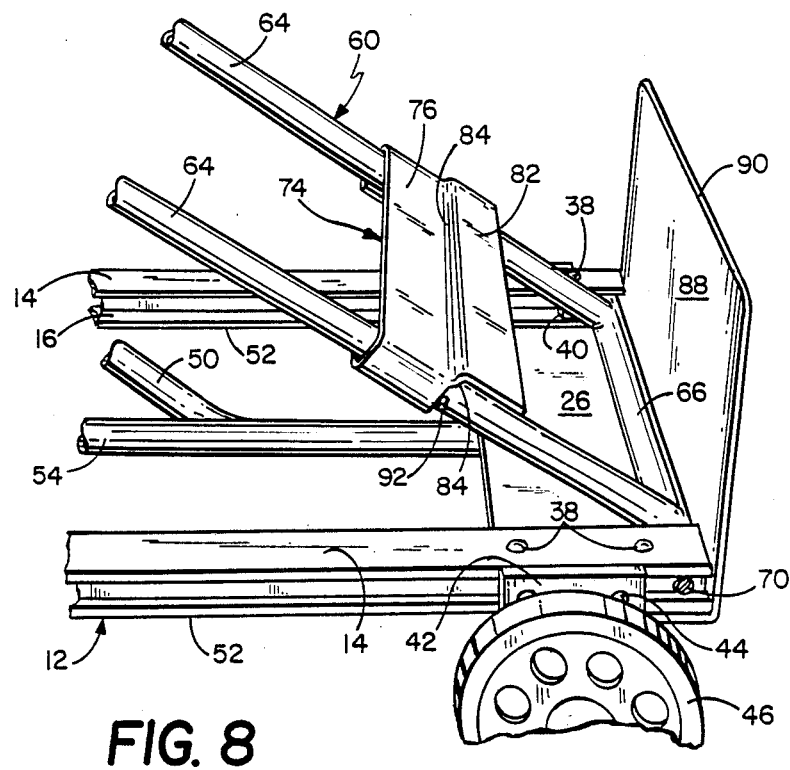
FIG. 8 is a perspective view of the bottom portion of the hand truck in the horizontal position with the handle member being pivoted to the stowed or retracted position.
Figure 9:
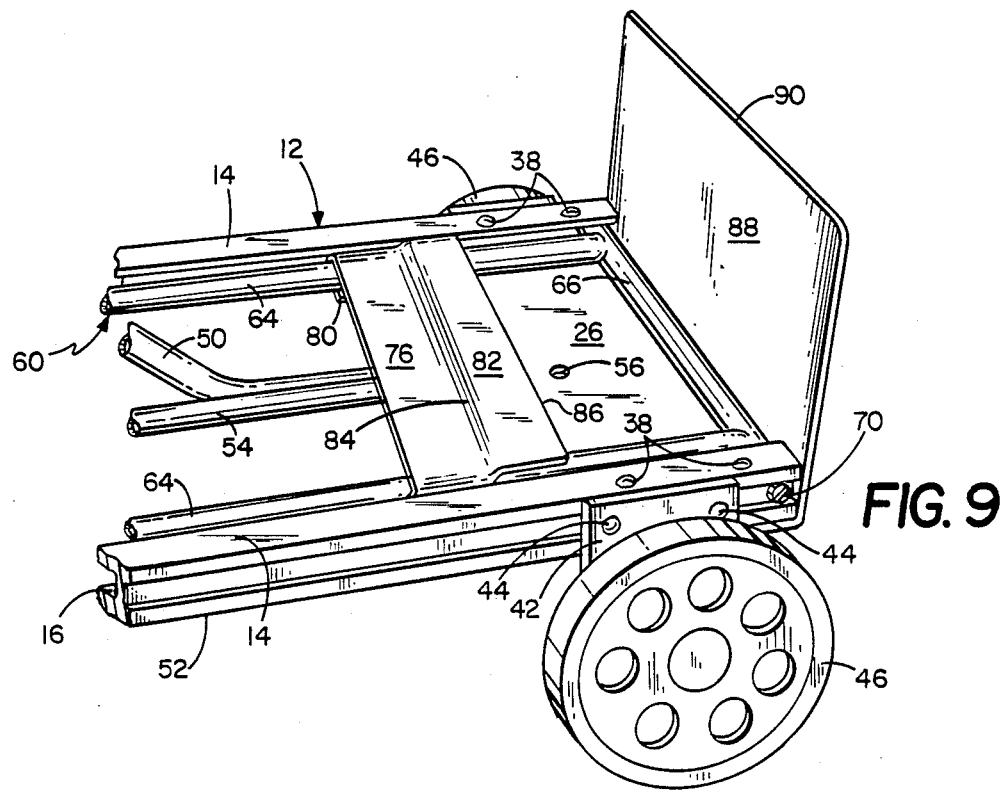
FIG. 9 is a perspective view of the bottom portion of the hand truck in the horizontal position with the handle member in the fully stowed or retracted position.

Referring particularly to FIGS. 1-3, it may be seen that the hand truck 10 includes a structural frame 12 consisting of a pair of generally parallel, spaced-apart side frame members 14 constructed from a squared U-shaped bar, defining a generally rectangular interior cavity 16 as shown in FIGS. 8, 9, and 11. The frame 12 includes a handgrip segment 18 having a pair of spaced-apart legs 20, each of which are received within the cavity 16 of an opposing one of the side frame members 14 near the top thereof, a top cross frame member 22 disposed from the handgrip segment 18 and positioned near the top of each side frame member 14, and a curved reinforcing segment 24 extending rearwardly from the plane of the frame and being fixedly connected to the handgrip segment 18 and top cross frame member 22. The frame 12 of the hand truck 10 is preferably constructed of a lightweight metal alloy.

At the bottom end of the hand truck 10, the side frame members 14 are connected by a first base plate 26 which extends between each of the side frame members 14 and is attached at each end thereto, and at the top end of the hand truck 10 the side frame members are connected by a second base plate 28 having a pair of forwardly extending ears 30 welded thereto which are disposed on the outer side of each of the side frame members 14, and attached thereto using threaded fasteners 32. A pair of small wheels 34 are rotatably mounted on the second base plate 28 by casters 36 connected to the second base plate 28, the rearmost portion of the small wheels 34 extending back further than the rearmost portion of the reinforcing segment 24.

The first base plate 38 is attached to each of the side frame members 14 by a pair of threaded fasteners 38, a cylindrical spacing block 40 circumscribing each threaded fastener 38 and being positioned within the cavity 16 of the side frame members 14.

A pair of opposing axle mounting brackets 42 are attached to the outer side of the side frame member 14 using threaded fasteners 44, and extend rearwardly from the side frame members 14. A pair of larger wheels 46 are mounted on the outer sides of the axle mounting brackets 42 and are carried on an axle 48 which extends through apertures in the axle mounting brackets 42.

Extending upwardly and forwardly from the inside surface of each of the axle mounting brackets 42 is an angled reinforcing bar 50, which is fixedly attached to both the axle mounting bracket 42 and the rear surface 52 of the side frame members 14. A central upright support member 54 is attached to the rear surface of the base plate 26 by a threaded fastener 56, as seen in FIG. 9, and extends upwardly and is attached to a middle cross frame member 58 which extends between the side frame members 14.

Pivotably mounted on the frame 12 near the bottom thereof is a handle member 60 consisting of a horizontal handgrip section 62, a pair of legs 64 extending generally perpendicularly from and connected to the ends of the handgrip section 62, and a bottom cross member 66 extending generally perpendicularly between and connected to the bottom ends of each of the legs 64 of the pivoting handle member 60. Referring to FIG. 11, it may be seen that the bottom cross member 66 extends outwardly a short distance on each side of the handle member 60 beyond the legs 64 to form a pair of opposing end segments 68. Each end segment 68 is received within the cavity 16 of one of the side frame members 14 and is pivotable secured to the outer wall thereof by a threaded fastener 70 which extends through an aperture 72 in the side frame member 14 and into the end surface of the end segment 68, thereby permitting the handle member 60 to pivot relative to the side frame members 14 of the frame 12.

Referring to FIGS. 4-9, it may be seen that a bracket member 74 is designed to be slidably and removably mounted on the handle member 60. The bracket member 74 consists of a generally planar lateral crosspiece 76 having a generally rectangular shape and a length measured between each end thereof slightly greater than or equal to the distance between the outer side edges of the legs 64 of the handle member 64 at the point of greatest separation. Extending in the same direction as one another generally perpendicularly from and connected to each end of the lateral crosspiece 76 are a pair of opposing and confronting end caps 78, with an end flange member 80 extending inwardly and generally perpendicularly from each end cap 78 and opposing and confronting the crosspiece 76 so as to form a pair of C-shaped guide members between and within which the legs 64 of the handle member 60 may be slidably received.

Extending from the crosspiece 76 of the bracket 74 along the length thereof is a generally planar tang member 82 which is displaced from the crosspiece 76 by and along an angled joint 84. The tang member 84 terminates in an edge 86. Attached to the bottom of the side frame members 14 and extending forwardly generally perpendicularly thereto is a generally planar rigid toe plate 88 which substantially supports the weight of an article (not shown) when the hand truck 10 is in the upright position as shown in FIGS. 1 and 2. The tang member 82 is displaced or disposed a distance equal to the thickness of the toe plate 88 from the legs 64 of the handle member 60 by the joint 84 sufficiently such that the lower edge 86 of the tang member 82 may slide down over and engage the top edge 90 of the toe plate 88 with the toe plate 88 being received at least partially between the tang member 82 and legs 64 as shown in FIG. 6, although the planar surface of the crosspiece 76 and tang member 82 preferably remain parallel to one another.

The bracket 74 including the tang member 82 and end caps 78 and end flanges 80 are preferably fabricated from a single piece of generally strong and resilient metal alloy or a fiber-reinforced plastic composite, and may have a springy characteristic allowing the guide means including the end caps 78 and end flanges 80 to contact and engage the legs 64 of the handle member 60. The tang member 82 is preferably a single piece having a length approaching that of the crosspiece 76 or the width of the toe plate 88, although the tang member 82 may also comprise a plurality of downwardly extending prongs which are fastened to the crosspiece 76 of the bracket 74 or are formed integrally therewith, so as to form means for releasably engaging the toe plate 88.

In operation, with the hand truck 10 in the horizontal position and the handle member 60 pivoted to the fully extended position, the bracket 74 may be positioned above the handle member 60 and lowered until the bracket 74 receives the handle member 60 with each leg 64 being partially encircled and engaged by the crosspiece 76 and one of the pair of end caps 78 and end flange members 80 as shown in FIG. 5. The bracket 74 may then be lowered until the tang member 74 engages and retains the toe plate 88, and thereby locks or restrains the handle member 60 in the upright or vertical position as shown in FIG. 6. By reversing this process, the bracket 74 may be selectively removed from the handle member 60 by the user at any time, and selectively remounted on the handle member 60.

The toe plate 88 has a generally planar top surface on which the article would rest in the generally upright position as shown in FIG. 1 and a generally planar bottom surface opposing the top surface, the crosspiece 76 has a generally planar front surface facing forward or away from the legs 64 of the handle member 60 in FIG. 8, and the tang member 82 similarly has a generally planar rear surface facing back toward the frame 12 and legs 64 of the handle member 60 for slidingly contacting the bottom surface of the toe plate 88, the planar surface of the tang member 82 being oriented generally parallel with the planar front surface of the crosspiece 76.

The bracket 74 may then be lifted upwardly along the legs 64 of the handle member 60 until the lower edge 86 of the tang member 82 is positioned above or disengaged from the top edge 90 of the toe plate 88, as shown in FIG. 7, and the handle member 60 may then be pivoted downwardly toward the frame 12 as shown in FIG. 8 until the legs 64 of the handle member 60 are received between the side frame members 14 and the tang member 82 of the bracket 74 is at least flush with the top or front surfaces of the side frame members 14 as shown in FIG. 9. By at least flush, it is intended that the front surface of the tang member 82 of the bracket 74 projects further forward than any other portion of the bracket 74, and when pivoted to the fully retracted position as shown in FIG. 9 with the hand truck 10 in the horizontal position, the front surface of the tang member 82 is disposed vertically below a line or plane extending between and parallel with the front surfaces of the side frame members 14.

In order to prevent the bracket 74 from inadvertently sliding down the legs 64 so that the tang member 82 wedges between the bottom cross member 66 and the toe plate 88, the bracket 74 may be supported vertically by a pair of pins 92 which are received within apertures 94 in the legs 64 as shown in FIGS. 8 and 10, the pins 92 being positioned so as not to interfere with the vertical movement of the tang member 82 in the downward direction when fully engaging the toe plate 88 as shown in FIG. 6.

The handgrip section 62 of the handle member 60 is engagingly received within a clasp or spring clamp 96 when the handle member 60 is pivoted to the fully retracted position proximate and parallel to the side frame members 14 as shown in FIGS. 1 and 9, the clamp 96 being attached to and positioned along the central upright support member 54 adjacent to the middle cross frame member 58.

While the preferred embodiment of the above hand truck 10 has been described in detail above with reference to he attached drawing figures, it is understood that various changes and adaptations may be made in the hand truck 10 without departing from the spirit and scope of the appended claims.

What is claimed is:

1. In a hand truck for use by a user in transporting an article, said hand truck comprising a frame which may be oriented in a generally upright position or a generally horizontal position, said frame having a bottom end, said hand truck having two pair of wheels rotatably mounted to said frame and being carried on one said pair of said wheels when in said upright position and by both said pairs of wheels when in said horizontal position, a toe plate extending generally perpendicularly from said frame adjacent said bottom end, a handle member having a pair of legs spaced apart a distance and a handgrip segment, said handle member being pivotably mounted to said frame adjacent said bottom end such that said handle member may pivot between a retracted position proximate to and generally parallel with said frame and an extended position proximate to and generally parallel with said toe plate, the improvement comprising:

means for selectively and releasably securing the handle member to the toe plate in the extended position, said means including a bracket member having a crosspiece, said crosspiece having a pair of ends and a length measured therebetween approximately equal to the distance the legs of the handle member are spaced apart, a pair of guide means, one of said guide means connected to and associated with each of said ends of said crosspiece for slidably receiving one of the legs of the handle member therein, such that said bracket member may be selectively and completely removed from the handle member, and tang means connected to and extending downwardly from said crosspiece for engaging said toe plate, said guide means being positioned and disposed so as to permit said crosspiece and said tang means to be completely and selectively removed from said handle member and selectively remounted thereon, whereby the handle member may be selectively pivoted between the extended position and the retracted position with the frame in the generally upright position for rolling movement of the hand truck on one of said pair of wheels, and the handle member may be pivoted to the extended position with the frame in the generally horizontal position for rolling movement of the hand truck on both of said pair of wheels and with the handle member releasably secured to the toe plate such that the user may grip the handgrip segment of the handle member to propel the hand truck.

2. The hand truck of claim 1 wherein the toe plate has a top edge and a thickness and the tang member is displaced from the legs of the handle member a distance greater than said thickness of the toe plate, such that the toe plate is received at least partially between the tang member and the legs of the handle member when the tang means engages the toe plate.

3. The hand truck of claim 2 wherein the tang member engages the toe plate proximate to the top edge of the toe plate.

4. The hand truck of claim 2 wherein the toe plate has a generally planar bottom surface, the crosspiece has a generally planar front surface, and the tang member has a generally planar rear surface for contacting the toe plate, said generally planar surface of the tang member being oriented generally parallel with said generally planar surface of the crosspiece.

5. The hand truck of claim 1 wherein the guide means includes a pair end caps, each end cap being connected to and extending generally perpendicularly from one of the ends of the crosspiece in the same direction as one another so as to confront one another, and a pair of end flanges, each said end flange being connected to and extending inward generally perpendicularly from one of the end caps so as to confront the crosspiece, each of the legs of the handle member being only partially encircled and engaged by the crosspiece and at least one of said end caps and at least one of said end flanges such that the crosspiece, the tang means, and the guide means may be slidably removed from the handle member and slidably remounted thereon.

6. The hand truck of claim 1 wherein the tang means has a generally planar front surface, the frame has a two opposing side frame members each having a front surface, and wherein the handle member is received between said side frame members when pivoted to the retracted position such that said front surface of the tang means is at least flush with said front surface of each of said side frame members.

7. The hand truck of claim 1 wherein the toe plate has a width and the tang means comprises a generally planar tang member having a length generally greater than one half of the width of the toe plate, said tang member being connected to and extending from the crosspiece along said length of said tang member.

8. The hand truck of claim 1 wherein the tang means comprises a generally planar tang member, said tang member extending from and being formed integrally with the crosspiece.

* * * * *